(12) United States Patent
Visser et al.

(10) Patent No.: US 6,309,754 B1
(45) Date of Patent: Oct. 30, 2001

(54) FUSING MEMBERS HAVING COPPER OXIDE-FILLED, ADDITION-CURED SILOXANE LAYERS

(75) Inventors: Susan Ann Visser; Charles E. Hewitt, both of Rochester, NY (US)

(73) Assignee: Nexpress Solutions LLC, Rochester, NY (US)

( * ) Notice: Subject to any disclaimer, the term of this patent is extended or adjusted under 35 U.S.C. 154(b) by 819 days.

(21) Appl. No.: 08/594,614

(22) Filed: Feb. 2, 1996

Related U.S. Application Data

(60) Provisional application No. 60/004,507, filed on Sep. 29, 1995.

(51) Int. Cl.[7] .................................................. B32B 13/04
(52) U.S. Cl. ...................... 428/446; 428/447; 428/411.1; 492/53
(58) Field of Search .................................. 428/446, 447, 428/411.1; 492/53

(56) References Cited

U.S. PATENT DOCUMENTS

| | | | |
|---|---|---|---|
| 4,074,001 | 2/1978 | Imai et al. | 428/329 |
| 4,360,566 | 11/1982 | Shimizu et al. | 428/404 |
| 4,373,239 | 2/1983 | Henry et al. | 29/132 |
| 4,375,505 | 3/1983 | Newkirk | 430/99 |
| 4,430,406 | 2/1984 | Newkirk et al. | 430/99 |
| 4,454,262 | 6/1984 | Fukayama et al. | 523/210 |
| 4,501,482 | 2/1985 | Stryjewski | 355/3 FU |
| 4,518,655 | 5/1985 | Henry et al. | 428/329 |
| 4,807,341 | 2/1989 | Nielsen et al. | 29/132 |
| 4,853,737 | 8/1989 | Hartley et al. | 355/289 |
| 4,970,098 | 11/1990 | Ayala-Esquillin et al. | 428/36.4 |
| 5,269,606 | 12/1993 | Hiroshi et al. | 384/49 |
| 5,269,740 * | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,336,593 | 8/1994 | Daifuku et al. | 430/558 |
| 5,370,931 * | 12/1994 | Frantangelo et al. | 428/447 |
| 5,480,075 * | 1/1996 | Fitzgerald et al. | 428/447 |

OTHER PUBLICATIONS

Fitzgerald, et al., "The Effect of Cyclic Stress on the Physical Properties of a Poly(Dimethylsiloxane) Elastomer," Polymer Eng. & Sci., vol. 32, No. 18 (Sep. 1992), pp. 1350–1357.

* cited by examiner

*Primary Examiner*—Mark Chapman
(74) *Attorney, Agent, or Firm*—Lawrence P. Kessler

(57) ABSTRACT

A fuser member having a layer which includes: an addition crosslinked polyorganosiloxane elastomer, and copper oxide particles dispersed therein in a concentration of from 5 to 40 percent of the total volume of the layer.

26 Claims, No Drawings

FUSING MEMBERS HAVING COPPER OXIDE-FILLED, ADDITION-CURED SILOXANE LAYERS

CROSS REFERENCE TO RELATED APPLICATION

Reference is made to and priority claimed from U.S. Provisional Application Ser. No. 60/004,507, filed Sep. 29, 1995, entitled FUSING MEMBERS HAVING COPPER OXIDE-FILLED, ADDITION-CURED SILOXANE LAYERS.

FIELD OF THE INVENTION

This invention relates to a fuser member useful for heat-fixing a heat-softenable toner material to a substrate. More particularly this invention relates to a fuser member having improved stability under conditions of elevated temperature and cyclic stress.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rollers, at least one of which (usually referred to as a fuser roller) is heated and contacts the toner-bearing surface of the receiver sheet in order to heat and soften the toner. The other roller (usually referred to as a pressure roller) serves to press the receiver sheet into contact with the fuser roller.

The fuser roller usually comprises a rigid core covered with a resilient material, which will be referred to herein as a "base cushion layer." The resilient base cushion layer and the amount of pressure exerted by the pressure roller serve to establish the area of contact of the fuser roller with the toner-bearing surface of the receiver sheet as it passes through the nip of the pair of rollers. The size of this area of contact helps to establish the length of time that any given portion of the toner image will be in contact with and heated by the fuser roller. The degree of hardness (often referred to as "storage modulus") and stability thereof, of the base cushion layer are important factors in establishing and maintaining the desired area of contact.

Also, often the pressure roller and fuser roller have a regular cylindrical shape, but it has been found in the prior art to be advantageous in some cases to change the shape of the pressure roller in order to vary the amount of pressure exerted by the pressure roller against the receiver sheet and fuser roller. This variance of pressure, in the form of a gradient of pressure that changes along the direction through the nip that is parallel to the axes of the rollers, can be established, for example, by continuously varying the overall diameter of the pressure roller along the direction of its axis such that the diameter is smallest at the midpoint of the axis and largest at the ends of the axis, in order to give the pressure roller a sort of "bow tie" or "hourglass" shape. This will cause the pair of rollers to exert more pressure on the receiver sheet in the nip in the areas near the ends of the rollers than in the area about the midpoint of the rollers. It is believed that this gradient of pressure helps to prevent wrinkles and cockle in the receiver sheet as it passes through the nip.

However, if, over time of use, the fuser roller begins to permanently deform to conform to the shape of the pressure roller, the gradient of pressure will be reduced or lost, along with its attendant benefits. It has been found that permanent deformation (alternatively referred to as "creep") of the base cushion layer of the fuser roller is the greatest contributor to this problem.

In the past, it was thought that various materials' suitability for use in fuser roller base cushion layers in terms of their stability during use—i.e., their ability to resist degradation (as evidenced by weight loss), creep, and changes in hardness, during use in fuser rollers—could be determined by subjecting samples of the materials to conditions of continuous high temperature and continuous high stress (i.e., pressure), and then measuring the resultant changes in weight, shape (e.g., length), and hardness (e.g., storage modulus). However, J. J. Fitzgerald et al, "The Effect of Cyclic Stress on the Physical Properties of a Poly (Dimethylsiloxane) Elastomer", *Polymer Engineering and Science*, Vol. 32, No. 18, (September 1992), pp. 1350–1357, indicates that such testing does not accurately portray the stability the materials will exhibit during actual use in fuser roller base cushion layers and that dynamic testing, with cycles of loading and unloading is necessary. The publication cites other reports showing the same kind of results in studies of other elastomers.

Fuser roller materials can be conveniently tested under conditions of cylic stress using a Mechanical Energy Resolver™ (also referred to herein as an "MER") commercially available from Instrumentors, Inc. This device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in the base cushion layer of a fuser roller during actual use.

Another consideration for fuser rollers is the materials that will contact the rollers during use. In a typical electrophotographic process fusing subsystem there are multiple sets of rollers. In order to prevent toner build-up on the rollers, image degradation, hot offset, and toner contamination problems which may decrease fuser roller life, release oil is often applied to the fusing roller.

The release oil is typically poly(dimethylsiloxane) oil (also referred to herein as "PDMS oil"), which is selected for its ability to withstand the almost continuous high temperatures (~200° C.) of the electrophotographic fusing process. While PDMS oil does an excellent job in its role as release agent, its compatibility with PDMS-based roller materials results in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roller. This can cause problems when different size papers are used and can lead to increased wear and decreased roller life.

One type of material that has been widely employed in the past to form a resilient base cushion layer for fuser rollers is condensation-crosslinked poly(dimethylsiloxane) elastomer. "Poly(dimethyl-siloxane)" will sometimes be alternatively referred to herein as "PDMS". The prior art has also taught or suggested that various fillers comprising inorganic particulate materials can be included in such PDMS base cushion layers to improve their mechanical strength and/or thermal conductivity. Higher thermal conductivity is advantageous when the fuser roller is heated by an internal heater, so that the heat can be efficiently and quickly transmitted toward the outer surface of the fuser roller and toward the toner on the receiver sheet that it is intended to contact and fuse. Higher thermal conductivity is not so important when the roller is intended to be heated by an external heat source. Disclosure of such filled condensation-cured PDMS elastomers for fuser rollers can be found, for example, in U.S. Pat. Nos., 4,373,239; 4,430,406; and 4,518,655.

One specific example of a condensation-crosslinked PDMS elastomer, which contains 32–37 volume percent (vol %) aluminum oxide filler and about 2–6 volume percent iron oxide filler, and which has been widely used and taught to be useful in fuser rollers, is sold under the tradename Stycast™ 4952 by Grace Specialty Polymers, W. R. Grace & Co. However, it has been found that fuser rollers containing Stycast™ 4952 cushion layers exhibit serious stability problems over time of use, i.e., significant degradation, creep, and changes in hardness, that greatly reduce their useful life. MER test results correlate with and predict the instability exhibited during actual use. Nevertheless, materials such as Stycast™ 4952 initially provide very suitable resilience, hardness, and thermal conductivity for fuser roller cushion layers.

Some condensation-crosslinked PDMS elastomers that show less change in hardness and creep than Stycast™ 4952 or aluminum oxide-filled PDMS are disclosed in U.S. patent application Ser. No. 08/167,584 now U.S. Pat. No. 5,480,724 (tin oxide filler), U.S. Pat. No. 5,292,606 (zinc oxide filler), U.S. Pat. No. 5,269,606 (copper oxide filler), U.S. Pat. No. 5,292,562 (chromium oxide filler), and U.S. Pat. No. 5,336,593 (nickel oxide filler).

U.S. patent application Ser. No. 08/306,066 now U.S. Pat. No. 5,480,725 discloses a tin oxide-filled, addition-cured polysiloxane system containing 0 to less than 20 mol % (mole percent) diphenyl units and the remainder dimethyl units. U.S. patent application Ser. No. 08/363,149 now U.S. Pat. No. 5,587,245 teaches a zinc oxide-filled, addition-cured polysiloxane system containing 0–25% phenyl. U.S. patent application Ser. No. 08/268,136 now U.S. Pat. No. 5,466,533 discloses a zinc oxide-filled, condensation-cured polydimethyl diphenyl siloxane system containing 20–40 wt % (weight percent) zinc oxide and less than 20 mol % polydiphenylsiloxane.

U.S. Pat. No. 4,970,098 by J. Ayala-Esquilin, W. H. Dickstein, J. L. Hedrick, Jr., J. C. Scott, and A. C. Yang discloses a diphenyl-dimethylsiloxane elastomer filled with 40–55 wt % zinc oxide of 100–500 nm (nanometers) particle size, 5–10 wt % graphite of less than 10 $\mu$m (micrometers) particle size, and 1–5 wt % ceric dioxide of 0.2–3 $\mu$m particle size. The diphenyl content was 20–50 wt % (equivalent to 8.5 to 27 mol %).

U.S. Pat. No. 4,807,341 by P. A. Nielsen and J. A. Pavlisko discloses a diphenyl-dimethylsiloxane elastomer containing 5–15 mol % diphenylsiloxane and 0–5% vinyl-addition crosslinked siloxane units. Aluminum oxide and iron oxide fillers were disclosed.

U.S. Pat. No. 4,074,001 describes fixing rollers for electrophotography which may comprise phenyl-substituted diorganopolysiloxanes filled with calcium carbonate (less than 10 $\mu$m particle size), iron oxide (less than 10 $\mu$m particle size), and titanium dioxide (less than 10 $\mu$m particle size).

U.S. Pat. No. 4,360,566 describes heat fixing rollers for electrophotography that may comprise addition-crosslinked diphenyl-substituted polyorganosiloxanes, filled with substantial amounts (50–250 parts by weight) of siliceous filler.

U.S. Pat. No. 4,454,262 describes silicone rubbers that may contain phenyl radicals and that contain spindle-shaped calcium carbonate filler.

Some of the above references have a variety of shortcomings. Many do not address the issue of improved stability under cyclic stress at elevated temperature optionally accompanied by reduced oil swell. Further, some of the references disclose costly fillers.

It is the objective of the present invention to improve the hardness (storage modulus) stability and minimize the weight loss and the creep (length change) of an addition-cured polysiloxane under conditions of elevated temperature and cyclic stress through the use of copper oxide filler, while also optionally improving the resistance to PDMS oil swell

SUMMARY OF THE INVENTION

The present invention relates to fuser members having a layer comprising a copper oxide-filled, addition-cured polysiloxane elastomer that exhibits good stability under conditions of elevated temperature and cyclic stress, i.e., good resistance to degradative weight loss, creep, and changes in hardness. Embodiments of the invention also exhibit increased resistance to swell with PDMS oil compared to PDMS elastomers. The layer includes an addition-crosslinked polyorganosiloxane elastomer, and copper oxide particles dispersed therein in a concentration of from about 5 to about 40 volume percent of the total volume of the layer.

DETAILED DESCRIPTION

The invention is directed to fuser members. The term "fuser member" is used herein to refer to components of an electrophotographic fusing system that engage a toner carrying receiver and fuse the toner by means of elevated temperature and pressure. Examples of such components include fuser rollers, pressure rollers, fuser platens, and fuser belts. The term fuser member is also used herein to refer to similar components, subject to similar conditions used in non-electrophotographic equipment. The term "fuser roller" may be used below in reference to particular embodiments of the invention; however, it is understood that the invention is not limited to fuser rollers.

The fuser member usually comprises a rigid support covered with one or more layers of elastomer. At least one of the elastomer layers, which will be referred to herein as the "A-layer," is an addition-cured polysiloxane having from about 5 to about 40 volume percent copper oxide particles as filler. The characteristics of the addition-cured, copper oxide-filled polysiloxane are discussed in detail below.

An elastomer layer coated onto the support that acts as a resilient material will be referred to herein as a "base cushion layer." In a fuser system consisting of a fuser roller and a pressure roller, the resilient base cushion layer on the fuser roller and/or the pressure roller and the amount of pressure exerted by the pressure roller serve to establish an area of contact of the fuser with the toner-bearing surface of the receiver sheet as it passes through the nip of the pair of rollers. The size of this area of contact helps to establish the length of time that any given portion of the toner image will be in contact with and heated by the fuser roller.

Fuser members in accordance with the invention can have the A-layer as the only elastomer layer or can have the A-layer as a base cushion layer with one or more layers over the base cushion layer or can have the A-layer as a top coat or intermediate layer in combination with one or more additional layers. Depending on the configuration selected, this can alleviate concerns about the wear-resistance or toner-release properties of the base cushion layer. Poor toner-release properties give rise to a phenomenon known as offset, which is the adherence of toner to the fuser member such that toner is pulled away from the receiver sheet as it exits the nip. Properties such as abrasion-resistance and resistance to toner offset can be provided by such other layer or layers over the base cushion layer, as is well known in the art. A variety of suitable materials for vaious fuser member layers are well known to those skilled in the art.

Release oils can be used with fuser members of the invention, although it is not always necessary or desirable. When used, the oil is typically continuously coated over the surface of the fuser member. The fuser member of the invention can be used with polydimethyl siloxane (or polydimethyldiphenylsiloxanes or polymethylphenylsiloxanes) or mercapto-functionalized polydimethylsiloxane (or mercapto-functionalized polydimethyldiphenylsiloxanes or mercapto-functionalized polymethylphenylsiloxanes) release oils at normally used application rates or at reduced application rates, from about 0.5 mg/copy to 10 mg/copy (the copy is 8.5 by 11 inch 20 pound bond paper).

In uses that would place the A-layer in direct contact with poly(dimethyl siloxane) (PDMS) release oil, it is desirable to either protect the A-layer by a barrier layer or the like or to use an embodiment of the invention in which the A-layer is resistant to release oil-induced swelling or deformation. Materials for the other layer or layers over the base cushion layer can be chosen to provide a barrier that prevents such release oil from coming into contact with the base cushion layer, as is well known in the art. In an appropriate embodiment of the invention, the A-layer can be a barrier layer for a base cushion layer of another material or for a base cushion A-layer that is not resistant to oil-induced deformation or is less resistant to oil-induced deformation.

For description of other layers and materials that are useful over fuser member base cushion layers, see, for example, U.S. Pat. Nos. 4,375,505; 4,430,406; 4,501,482; and 4,853,737. In some specific embodiments of the present invention, the base cushion layer has one other layer thereover, which is an oil-barrier layer comprising poly (vinylidene fluoride-co-hexafluoropropylene), a material commercially available, for example, from DuPont, Inc, under the trademark, Viton A™. In some other specific embodiments, there are two layers over the base cushion layer, e.g., an oil-barrier layer and, thereover, an outermost layer that provides good wear-resistance and toner-release properties, comprising, for example, a vinyl-addition-crosslinked siloxane having silica and titania fillers dispersed therein, such as is commercially available from Dow-Corning, Inc., under the trademark, Silastic E™.

Usually, layers overlying a base cushion layer are flexible but thinner than the base cushion layer, so that the base cushion layer can provide the desired resilience to the fuser member, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm (millimeters) have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The rigid support of the fuser member is often a cylindrical core composed of any rigid metal, ceramic, or plastic substance. The material should have sufficient ductility to avoid breakage of the core during normal maintenance and operation of an electrophotographic machine. Metal cores are preferred if the member is to be internally heated because of the higher thermal conductivity of metal. Suitable core materials can include aluminum, stainless steel, metal alloys, ceramic materials, combinations of ceramic and polymeric materials, and polymeric materials such as thermoset resins with or without reinforcing additives.

The addition-crosslinked siloxane elastomer in the base cushion layer of fuser rollers provided by the invention can be formed by addition reaction of vinyl substituted multifunctional siloxane polymers with multifunctional organohydrosiloxanes or multifunctional siloxysilanes. The term "multifunctional" means having two or more reactive groups.

Vinyl substituted multifunctional siloxane polymers and their preparation are well known to those skilled in the art. The vinyl substituted multifunctional siloxane polymers have the following repeating subunits:

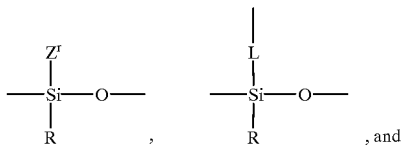

, and

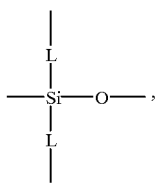

and terminal subunits having the general structure:

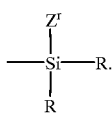

Designations, such as $Z^r$, R, and L, in all structural formulas herein; are used in a uniform manner and have the following meanings.

R is alkyl having from 1 to 8 carbons, or aryl having a solitary ring of from 6 to 14 carbons including carbons of any ring substituents. About 25 percent or less of the R groups are aryl. Specific examples of R groups include: methyl, ethyl, propyl, butyl, and phenyl. R groups can be substituted, however, subsituents should not degrade the characteristics of the resulting elastomer. For example, R groups that react with olefins or organo-hydrosiloxanes are undesirable. A specific example of R substitution of a siloxane polymer is: R=0 to about 25 percent phenyl and the remainder methyl. Another example is a siloxane polymer having 0 to about 25 mole percent, more preferably 3 to 20 mole percent, most preferably 10 to 17 mole percent diphenyl silyl and the remainder dimethyl silyl.

$Z^r$ represents Z or R, subject to the limitation that each molecule of vinyl substituted multifunctional siloxane polymer has two or more Z moieties (and thus 2 or more terminal vinyl groups).

Z is an olefinic group having from 2 to 8 carbons and a terminal vinyl moiety. Specific examples of Z groups include: vinyl and allyl.

L is —O— or —$(CH_2)_e$—, where e is an integer from 1 to about 8.

The vinyl substituted multifunctional siloxane polymers can be represented, at least in so far as the currently preferred embodiments of the invention, by the general structure (referred to herein as "structure I"):

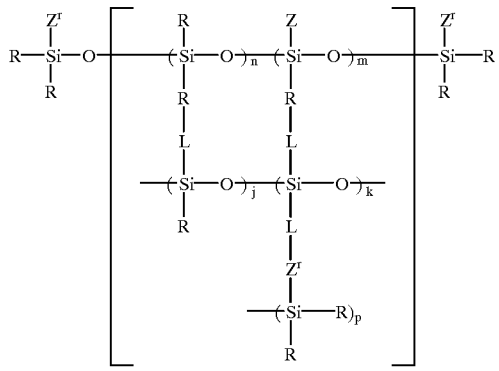

Each repeating subunit that has one or more L moieties (also referred to herein as branching subunits) represents a branch point. Branches may extend outward in the form of a dendrite or star, or may form crosslinks to other chains. The value of p, the number of terminal units on branches, is equal to or less than the total number of branching units, j+2k, or may be as low as zero if all branching subunits form crosslinks.

The extent of branching or crosslinking of the siloxane polymer is low, since the resulting elastomer would otherwise be excessively hard. If n+m+j+k is defined as being equal to 100 mole percent; then j+k is less than 5 mole percent, and preferably is from 2 mole percent to 0 mole percent. The latter represents a preferred siloxane polymer, in which branching subunits are completely or substantially excluded. For this polymer, structure I can be simplified to the following (structure II):

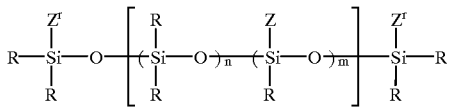

The siloxane polymer has at least two olefinic functionalities (in structures I or II; Z, or $Z^r$, or a combination of Z and $Z^r$). The percentage of silicon atoms substituted by an olefinic moiety can be higher than two, but must be low enough to prevent the resulting elastomer from being excessively hard due to extensive crosslinking. It is preferred that the percentage of silicon atoms substituted by an olefinic moiety is less than 3 percent of the total number of silicon atoms; or, more preferably, less than 2 percent of the total number of silicon atoms.

In particular embodiments of the invention, the value of m is 0 or 1 and $Z^r$ is olefinic. In one such embodiment, structure II can be simplified as (structure III):

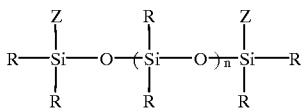

In some other embodiments of the invention, $Z^r$ is R. In one such embodiment, structure II can be simplified as (structure IV):

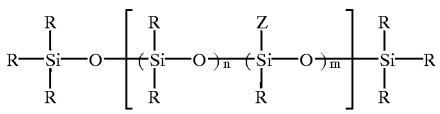

In particular embodiments of the invention, Z or $Z^r$ groups each have the general structure

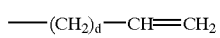

where d is an integer from 0 to about 6 and preferably from 0 to 3. In one such embodiment, the siloxane polymer has the general structure (structure V):

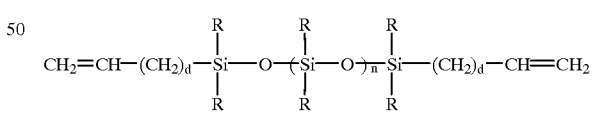

A specific example of such a siloxane polymer is vinyldimethyl terminated polydimethylsiloxane, which has the general structure:

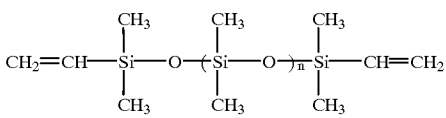

Another example is a vinyldimethyl terminated dimethyldiphenyl copolymer, which has the general structure:

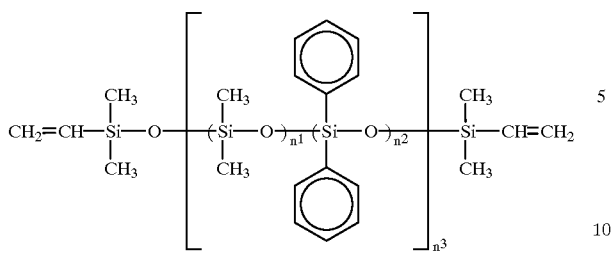

where $n^1+n^2=n^3$ and $n^1/n^2$ is greater than or equal to 3/1. More preferably, greater than or equal to 4/1 and less than 33/1; most preferably greater than 5/1 and less than 10/1. Many of these materials are commercially available from United Chemical Technologies, Inc., Piscataway, N.J., under various designations depending upon the viscosity (and values of n or $n^1$, $n^2$, and $n^3$).

In another such embodiment, the siloxane polymer has the general structure (structure VI):

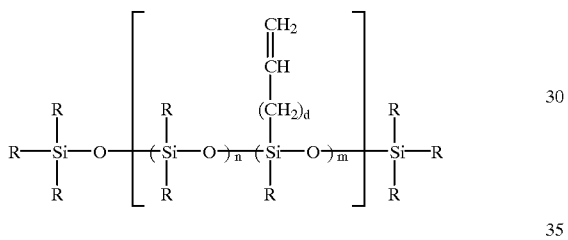

The designations n, m, and d have the same meanings as given above. A specific example of such a siloxane polymer is vinylmethyl siloxane copolymers in which each R is methyl.

In the structural formulas above, the values of n, $n^3$ or n+m, or n+m+j+k, are integers such that the respective polymer has a weight average molecular weight (Mw) between vinyl groups of from 7,000 to 100,000. Unless otherwise indicated, the molecular weights reported are weight average molecular weights. If the molecular weight between vinyl groups is above 100,000, the final crosslinked polymer would be too unstable under conditions of high temperature and cyclic stress (i.e., there would be too much creep and change in hardness over time), even when filler is dispersed therein in accordance with the invention. If the molecular weight between vinyl groups is below 7,000, the final crosslinked elastomer would have a high crosslink density that would make the material too hard and brittle, and not resilient enough to serve practically in a base cushion layer. (For the siloxane polymers of structure I, a standard for "excessive hardness" is established by final crosslinked elastomer prepared using siloxane polymer having a molecular weight between vinyl groups below 7,000. Any final crosslinked elastomer having a similar or greater hardness is excessively hard.)

The multifunctional organo-hydrosiloxanes that can serve as crosslinking agents for the structure I polymers have the general structure:

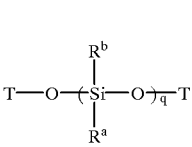

Each T represents:

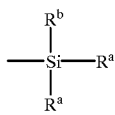

or both T's together represent atoms completing an organo-hydrosiloxane ring, such that structure VII can be rewritten:

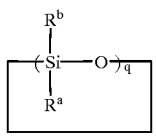

$R^a$ represents the same groups as R: alkyl having from 1 to 8 carbons, or aryl having a solitary ring of from 6 to 14 carbons including carbons of any ring substituents. Specific examples of $R^a$ groups include: methyl, ethyl, butyl, and phenyl. $R^b$ represents H or $R^a$. At least two $R^b$ moieties are H. It is currently preferred that $R^a$ be methyl. It is currently preferred that T be trimethylsilyl. The value of q is from 3 to about 300. A specific example of a suitable multifunctional organo-hydrosiloxane is a material marketed as PS123, by United Chemical Technologies, Piscataway, N.J. This material has the general structure:

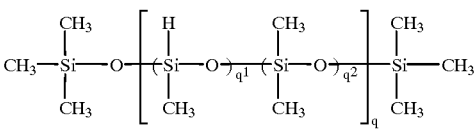

where $q^1+q^2=q$, and a molecular weight of about 900 to 3,500, more preferably 2,000 to 2,500. Another example is 1,3,5,7-tetramethylcyclotetrasiloxane, which is also available from United Chemical Technologies.

Alternative crosslinking agents include multifunctional siloxy-silanes, such as methyltris(dimethylsiloxy)silane (M9195 from United Chemical Technologies, Piscataway, N.J.) or tetrakis(dimethylsiloxy)silane (T1915 from United Chemical Technologies, Piscataway, N.J.), as crosslinking agents. Their general structure is:

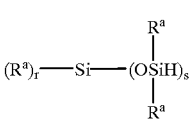

where $R_a$ is as defined in structure (VII), r is 0 or 1, s is 3 or 4, and r+s=4.

The addition crosslinking reaction is carried out with the aid of a late transition metal catalyst, such as cobalt, rhodium, nickel, palladium or platinum catalysts. Specific examples of such catalysts include chlorotris(triphenylphosphine)rhodium(I), $RhCl(Ph_3P)_3$; dicobaltoctacarbonyl, $Co_2(CO)_8$; and chloroplatinic acid, $H_2PtCl_6$. Chloroplatinic acid is currently preferred. In a particular embodiment of the invention, the catalyst is added as a complex with vinyl-terminated polysiloxane. Currently preferred is a catalyst complex sold commercially as PC075 by United Chemical Technologies. This material is a complex of chloroplatinic acid and cyclovinylmethyl siloxane and has a platinum concentration of 2 to 3 percent. It is also currently preferred that the PC075 complex be diluted with vinyl-terminated dimethylsiloxane polymer to provide a final platinum concentration of from 0.3–1.2 parts per million, depending upon the desired cure rate. A suitable polysiloxane diluent is marketed by United Chemical Technologies as PS441.2 (viscosity=0.2 Pa s).

The copper oxide particles employed as filler in the layer of a fuser member of the invention can be obtained from any convenient commercial source, for example Aldrich Chemical Company, Inc., Milwaukee, Wis. The particle size does not appear to be critical. Particles sizes anywhere in the range of 0.1 to 100 micrometers have been found to be acceptable. The preferred copper oxide particles are from 2 to 20 micrometers in diameter.

The copper oxide filler particles are mixed with the structure (I) polymer and multifunctional organohydrosiloxane or silane crosslinker prior to curing the mix on the fuser member core to form the base cushion layer. The copper oxide particles comprise from about 5 to about 40 volume percent, preferably 15 to 40 volume percent and more preferably 30 to 40 volume percent of the total volume of the base cushion layer. Concentrations less than 5 volume percent provide lesser degrees of stability. Concentrations of greater than 40 volume percent will render the layer too hard to provide the desired area of contact with the toner-bearing receiver sheet.

In cases where it is intended that the fuser member be heated by an internal heater, it is desirable that the base cushion layer have a relatively high thermal conductivity so that the heat can be efficiently and quickly transmitted toward the outer surface of the fuser member that will contact the toner intended to be fused. Copper oxide filler particles increase the thermal conductivity of an addition-crosslinked siloxane base cushion layer. When copper oxide particles are dispersed in the base cushion layer at a concentration of from 30 to 40 percent of the total volume of the layer, the thermal conductivity of the layer is comparable to or greater than prior art base cushion layer formulations, such as the previously mentioned Stycast™ 4952.

To form the base cushion layer of a fuser member in accordance with the invention, the structure I polymer, a slight excess of the stoichiometric amount of crosslinking agent to form crosslinks with all the vinyl groups of the structure I polymer, and the appropriate amount of copper oxide filler are thoroughly mixed on a three-roller mill or using another mixing method know to those skilled in the art. The catalyst then is added to the mix with thorough stirring. The mix then is degassed and injected into a mold surrounding the fuser member core to mold the material onto the core. Alternatively, the material is prepared in two parts, part A and part B. Part A contains structure I polymer, the crosslinking agent, and copper oxide filler. Part B contains structure I polymer, copper oxide filler, and catalyst. Parts A and B are mixed in a ratio appropriate for the desired formulation. Parts A and B are formulated such that a slight excess of the stoichiometric amount of crosslinking agent to form crosslinks with all the vinyl groups of the structure I polymer from both Parts A and B is included and such that the appropriate amount of filler and catalyst for the entire mix is included. Parts A and B are mixed in an appropriate ratio, eg., one to one. The mix of Parts A and B is degassed and injected into a mold surrounding the fuser member core to mold the material onto the core. For either alternative, the covered core in the mold is placed in an oven at elevated temperature and remains in the mold for a time sufficient for some crosslinking to occur (e.g., 1 hour at 175° C.). The covered roller is then removed from the mold and heated to accelerate the remaining crosslinking. The other layer or layers are then coated thereover by any appropriate method.

Where the layer of the invention is a base cushion layer, it is preferred currently to apply the layer of the invention over a support which has been primed with a primer designed for addition-cured systems, such as DC92-023, sold commercially by Dow Corning Corporation, Midland, Mich. The core is prepared for primer application by washing, grit blasting, or other methods known in the art.

If the described layer is coated over another coating layer, one or more methods of layer-to-layer adhesion improvement, such as corona discharge treatment of the other layer's coating surface, may be applied prior to application of the material. Various methods of layer-to-layer adhesion improvement are well known to one skilled in the art.

The following specific materials were used in the examples which follow:

PS442 is vinyldimethyl-terminated poly(dimethyl siloxane) (PDMS) with a viscosity of 0.5 Pa s (Pascal-second) at 25° C. and a weight-average molecular weight $M_W$ of 25,200, relative to a polystyrene standard. PS445 is a vinyldimethyl-terminated poly(dimethyl siloxane) with a viscosity of 10 Pa s at 25° C. and an $M_W$ of 76,000, relative to a polystyrene standard. PS782 is a vinyldimethyl-terminated poly(16 mol % diphenyl/84% dimethyl siloxane) with a viscosity of 0.5 Pa s (Pascal-second) at 25° C. and an $M_W$ of 14,100, relative to a polystyrene standard. PS793 is a vinyldimethyl-terminated poly(24 mol % diphenyl/76% dimethyl siloxane) with a viscosity of 1.5 Pa s at 25° C. and an $M_W$ of 13,000 relative to a polystyrene standard. PS 442, PS445, PS782, and PS793 were obtained from United Chemical Technologies, Inc., Piscataway, N.J.

The weight average molecular weights ($M_W$) of the polymers were analyzed by size exclusion chromography (SEC) using three PLgel Mixed B 7.5×300 mm mixed bed columns (Polymer Laboratores, Inc., Amherst, Mass.). PS442 and PS445 were analyzed in toluene. PS782 and PS793 were analyzed in tetrahydrofuran (THF). The column set was calibrated with narrow-molecular weight distribution polystyrene standards between 595 and 2,750,000 daltons. Distributions and molecular weight averages have not been corrected for axial dispersion. The long term precision of $M_W$ for a broad polystyrene standard using this method is ±5%.

PS123 is a trimethylsilyl terminated-poly(40 mol % methylhydro/60 mol % dimethyl siloxane). PS122.5 is a trimethylsilyl terminated-poly(65 mol % methylhydro/ 35 mol % dimethyl siloxane). NM203 is a trimethylsilyl terminated-poly(95 mol % methylhydro/5 mol % dimethyl siloxane). M9195 is methyltris(dimethylsiloxy)silane. These four multifunctional crosslinking agents were obtained from United Chemical Technologies, Inc., Piscataway, N.J.

PC075, sold by United Chemical Technologies, is a complex of chloroplatinic acid and vinyl-terminated polydimethysiloxane and has a platinum concentration of 2–3 percent. The currently preferred catalyst mixture is the PC075 complex diluted with a vinyl-terminated PDMS, such as PS441.2, to provide a final platinum concentration of from 0.3–1.2 parts per million, depending upon the desired cure rate and properties. A suitable diluent is PS441.2, sold by United Chemicals. PS441.2 is a vinyldimethyl-terminated PDMS with a viscosity of 0.2 Pa s at 25° C.

The copper oxide used was catalog number 20,884-1 from Aldrich Chemical Company, Milwaukee, Wis. The copper oxide particles were from 2 to 20 micrometers in diameter. The aluminum oxide used was T64 tabular alumina, obtained from Whittaker, Clark, and Daniels, Inc. The aluminum oxide particles were 1–40 micrometers in diameter.

The following examples are presented to further illustrate some specific materials in accordance with the invention and to compare their properties with materials not within the scope of the invention.

EXAMPLE 1
PDMS (0.5 Pa s) with 10 Vol % Copper Oxide

| Formulation: | | |
| --- | --- | --- |
| | Volume % | Weight % |
| PDMS PS442 | 85.81 | 54.99 |
| PS123 crosslinker | 4.18 | 2.74 |
| Copper oxide | 10.00 | 42.27 |

Sample slabs of copper oxide-filled, addition-crosslinked siloxane elastomer were prepared by mixing siloxane, crosslinking agent, and filler on a three-roller mill in the proportions listed above. The catalyst then was stirred into the mixture in the ratio 0.1 parts by weight catalyst to 100 parts by weight filled mixture. The catalyst contained 0.22 parts by weight PC075 and 1 part by weight PS441.2. The mixture was degassed and injected into the mold, where it was incubated for 15 min. at 75° C. The slab (127 mm×127 mm×1.9 mm) was removed from the mold and further incubated by ramping to 205° C. over the course of 2 hours and holding at 205° C. for an additional 8 hours.

Thermal conductivity was measured using a Holometrix™ TCA-100 thermal conductivity analyzer at 175° C.

Circular disks (12 mm diameter) were cut from the slab. The storage modulus determination was done in accordance with the method of calculation described in Fitzgerald, at al., "The Effect of Cyclic Stress on the Physical Properties of a Poly(dimethylsiloxane) Elastomer," Polymer Engineering and Science, Vol. 32, No. 18 (September 1992), pp. 1350–1357. Six of the circular disks were stacked, one upon the other, weighed, and then placed in a test instrument called a Mechanical Energy Resolver™ (also referred to herein as an "MER"), commercially available from Instrumentors, Inc., Strongville, Ohio. The instrument heated the stack to 218° C. and imposed a static compressive force of 8 kg on the stack. The length of the stack under the initial compressive force was then measured, as was the initial hardness (expressed in terms of "Initial storage modulus" or "Initial S.M."). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness ("Final Storage Modulus" or "Final S.M.") and length of the six-disk stack under the static 8 kg compressive force were measured, as was the final weight of the sample stack. Results of these tests are summarized in Table 1.

Swell of the elastomer in polydimethylsiloxane release oil was measured by weighing a piece of slab prior to immersion in 0.35 Pa s polydimethylsiloxane oil, marketed by Dow Corning Corp. of Midland, Mich., as DC200. The slab was incubated in oil for 7 days at 175° C., blotted dry, and weighed again. The percentage change in weight is designated "Oil swell" in Table 1.

EXAMPLE 2
PDMS (0.5 Pa s) with 20 Vol % Copper Oxide

| Formulation: | | |
| --- | --- | --- |
| | Volume % | Weight % |
| PDMS PS442 | 76.03 | 36.18 |
| PS123 crosslinker | 3.97 | 1.81 |
| Copper oxide | 20.00 | 62.01 |

The slab for this example was prepared as for Example 1, except that 20 vol % copper oxide filler was used and the material was cured in the mold for 15 minutes at 75° C. and then 5 minutes at 175° C. prior to removal from the mold. Further incubation by ramping to 205° C. over the course of 2 hours and holding at 205° C. for an additional 8 hours was performed as for the material of Example 1. The sample was tested for thermal conductivity, stability under cyclic strain at elevated temperature using the MER, and for oil swell, as described above.

The thermal conductivity, MER, and oil swell results appear in Table 1.

EXAMPLE 3
PDMS (0.5 Pa s) with 30 Vol % Copper Oxide

| Formulation: | | |
| --- | --- | --- |
| | Volume % | Weight % |
| PDMS PS442 | 66.53 | 25.08 |
| PS123 crosslinker | 3.47 | 1.25 |
| Copper oxide | 30.00 | 73.67 |

The slab for this example was prepared as for Example 1, except that 30 vol % copper oxide filler was used. The sample was tested for thermal conductivity, stability under cyclic strain at elevated temperature using the MER, and for oil swell, as described above.

The thermal conductivity, MER, and oil swell results appear in Table 1.

EXAMPLE 4
PDMS (0.5 Pa s) with 40 Vol % Copper Oxide

| Formulation: | | |
|---|---|---|
|  | Volume % | Weight % |
| PDMS PS442 | 57.21 | 17.66 |
| PS123 crosslinker | 2.79 | 0.88 |
| Copper oxide | 40.00 | 81.46 |

The slab for this example was prepared as for Example 1, except that 40 vol % copper oxide filler was used. The sample was tested for thermal conductivity, stability under cyclic strain at elevated temperature using the MER, and for oil swell, as described above.

The thermal conductivity, MER, and oil swell results appear in Table 1.

EXAMPLE 5
PDMS (10 Pa s) with 40 Vol % Copper Oxide

| Formulation: | | |
|---|---|---|
|  | Volume % | Weight % |
| PDMS PS445 | 57.21 | 17.66 |
| PS123 crosslinker | 2.79 | 0.88 |
| Copper oxide | 40.00 | 81.46 |

The slab for this example was prepared as for Example 1, except that PS445 was used instead of PS442, 40 vol % copper oxide filler was used, and the catalyst was added at 0.05 parts catalyst to 100 parts filled mixture. The sample was tested for thermal conductivity, stability under cyclic strain at elevated temperature using the MER, and for oil swell, as described above.

The thermal conductivity, MER, and oil swell results appear in Table 1.

EXAMPLE 6
PDMS (10 Pa s) with Higher Crosslinker and 35 Vol % Copper Oxide

| Formulation: | | |
|---|---|---|
|  | Volume % | Weight % |
| PDMS PS445 | 58.86 | 20.10 |
| PS123 crosslinker | 6.14 | 2.01 |
| Copper oxide | 35.00 | 77.89 |

The slab for this mixture was prepared as for Example 5, except that more crosslinker was used, as detailed above, 35 vol % copper oxide was used, the catalyst was added at 0.07 parts catalyst to 100 parts filled mixture, and the material was cured in the mold for 15 minutes at 75° C. and then 15 minutes at 175° C. prior to removal from the mold. Further incubation by ramping to 205° C. over the course of 2 hours and holding at 205° C. for an additional 8 hours was performed as for the material of Example 5. The sample was tested for thermal conductivity, stability under cyclic strain at elevated temperature using the MER, and for oil swell, as described above.

The thermal conductivity, MER, and oil swell results appear in Table 1.

EXAMPLE 7
PDMS (10 Pa s) with Higher Methylhydro-content Crosslinker and 35 Vol % Copper Oxide

| Formulation: | | |
|---|---|---|
|  | Volume % | Weight % |
| PDMS PS445 | 61.78 | 21.09 |
| PS122.5 crosslinker | 3.22 | 1.05 |
| Copper oxide | 35.00 | 77.85 |

The slab for this mixture was prepared as for Example 5, except that PS 122.5 was used as crosslinker and the copper oxide content was 35 vol %. The sample was tested for thermal conductivity, stability under cyclic strain at elevated temperature using the MER, and for oil swell, as described above.

The thermal conductivity, MER, and oil swell results appear in Table 1.

EXAMPLE 8
PDMS (10 Pa s) with Higher Methylhydro-content Crosslinker and 35 Vol % Copper Oxide

| Formulation: | | |
|---|---|---|
|  | Volume % | Weight % |
| PDMS PS445 | 61.78 | 21.09 |
| NM203 crosslinker | 3.22 | 1.05 |
| Copper oxide | 35.00 | 77.85 |

The slab for this mixture was prepared as for Example 5, except that NM203 was used as crosslinker, the copper oxide content was 35 vol %, the catalyst was added at the ratio of 0.1 parts catalyst to 100 parts filled mixture, and the material was cured in the mold for 15 min at 175° C. prior to removal from the mold. Further incubation by ramping to 205° C. over the course of 2 hours and holding at 205° C. for an additional 8 hours was performed as for the material of Example 5. The sample was tested for thermal conductivity, stability under cyclic strain at elevated temperature using the MER, and for oil swell, as described above.

The thermal conductivity, MER, and oil swell results appear in Table 1.

EXAMPLE 9
Poly(16 Mol % Diphenyl/84 Mol % Dimethyl Siloxane) with 35 Vol % Copper Oxide

| Formulation: | | |
|---|---|---|
| | Volume % | Weight % |
| Poly(16% diphenyl/84% dimethyl siloxane) PS782 | 61.78 | 21.09 |
| PS123 crosslinker | 3.22 | 1.05 |
| Copper oxide | 35.00 | 77.85 |

The slab for this material was prepared as in Example 1, except that PS782 was used as the siloxane, the copper oxide content was 35 vol %, and the material was cured in the mold for 30 min at 175° C. prior to removal from the mold. Further incubation by ramping to 205° C. over the course of 2 hours and holding at 205° C. for an additional 8 hours was performed as for the material of Example 1. The sample was tested for thermal conductivity, stability under cyclic strain at elevated temperature using the MER, and for oil swell, as described above.

The thermal conductivity, MER, and oil swell results appear in Table 1.

EXAMPLE 10
Poly(16 Mol % Diphenyl/84 Mol % Dimethyl Siloxane) with Siloxy-silane Crosslinker and 35 Vol % Copper Oxide

| Formulation: | | |
|---|---|---|
| | Volume % | Weight % |
| Poly(16% diphenyl/84% dimethyl siloxane) PS782 | 61.78 | 21.09 |
| M9195 crosslinker | 3.22 | 1.05 |
| Copper oxide | 35.00 | 77.85 |

The slab for this material was prepared as in Example 9, except that the crosslinker used was methyltris(dimethylsiloxy) silane M9195. The sample was tested for thermal conductivity, stability under cyclic strain at elevated temperature using the MER, and for oil swell, as described above.

The thermal conductivity, MER, and oil swell results appear in Table 1.

EXAMPLE 11
Poly(24 Mol % Diphenyl/76 Mol % Dimethyl Siloxane) with 30 Vol % Copper Oxide

| Formulation: | | |
|---|---|---|
| | Volume % | Weight % |
| Poly(24% diphenyl/76% dimethyl siloxane) PS793 | 66.75 | 24.91 |
| PS123 crosslinker | 3.25 | 1.24 |
| Copper oxide | 30.00 | 73.85 |

The slab for this material was prepared as in Example 9, except that the siloxane used was PS793, the copper oxide content was 30 vol %, and the material was cured in the mold for 15 min at 175° C. prior to removal from the mold. Further incubation by ramping to 205° C. over the course of 2 hours and holding at 205° C. for an additional 8 hours was performed as for the material of Example 9. The sample was tested for thermal conductivity, stability under cyclic strain at elevated temperature using the MER, and for oil swell, as described above.

The thermal conductivity, MER, and oil swell results appear in Table 1.

Comparative Example 1

PDMS (0.5 Pa s) with 35 Vol % Aluminum Oxide

| Formulation: | | |
|---|---|---|
| | Volume % | Weight % |
| PDMS PS442 | 61.97 | 29.75 |
| PS123 crosslinker | 3.03 | 1.49 |
| Aluminum oxide | 35.00 | 68.77 |

The slab for this material was prepared as in Example 1, except that the filler was 35 vol % aluminum oxide. The sample was tested for thermal conductivity, stability under cyclic strain at elevated temperature using the MER, and for oil swell, as described above.

The thermal conductivity, MER, and oil swell results appear in Table 1.

Comparative Example 2

Poly(16 Mol % Diphenyl84 Mol % Dimethyl Siloxane) with 35 Vol % Aluminum Oxide

| Formulation: | | |
|---|---|---|
| | Volume % | Weight % |
| Poly(16% diphenyl/84% dimethyl siloxane) PS782 | 61.97 | 29.74 |
| PS123 crosslinker | 3.03 | 1.49 |
| Aluminum oxide | 35.00 | 68.77 |

The slab for this material was prepared as in Example 9, except that the filler was 35 vol % aluminum oxide and the material was cured in the mold for 10 minutes at 175° C. prior to removal from the mold. Further incubation by ramping to 205° C. over the course of 2 hours and holding at 205° C. for an additional 8 hours was performed as for the material of Example 9. The sample was tested for thermal conductivity, stability under cyclic strain at elevated temperature using the MER, and for oil swell, as described above.

The thermal conductivity, MER, and oil swell results appear in Table 1.

Comparative Example 3
Poly(24 Mol % Diphenyl/76 Mol % Dimethyl Siloxane) with 35 Vol % Aluminum Oxide

| Formulation: | | |
|---|---|---|
| | Volume % | Weight % |
| Poly(24% diphenyl/76% dimethyl siloxane) PS793 | 61.97 | 29.74 |
| PS123 crosslinker | 3.03 | 1.49 |

-continued

| Formulation: | | |
|---|---|---|
| | Volume % | Weight % |
| Aluminum oxide | 35.00 | 68.77 |

The slab for this material was prepared as in Example 11, except that the filler was 35 vol % aluminum oxide, the catalyst contained 0.22 parts PC075 and one part PS441.2, and the material was cured in the mold for 10 minutes at 175° C. prior to removal from the mold. Further incubation by ramping to 205° C. over the course of 2 hours and holding at 205° C. for an additional 8 hours was performed as for the material of Example 11. The sample was tested for thermal conductivity, stability under cyclic strain at elevated temperature using the MER, and for oil swell, as described above.

The thermal conductivity, MER, and oil swell results appear in Table 1.

Comparative Example 4
Stycast™ 4952

Condensation-curable PDMS filled with 32–37 vol % aluminum oxide and 2–6 vol % iron oxide particulate fillers is commercially available from Grace Specialty Polymers, USA, under the trade name Stycast™ 4952. Samples of Stycast™ 4952 were prepared by mixing 200 parts by weight of the filled PDMS material with I part by weight CAT 50 catalyst. (CAT 50 is a catalyst mixture that is commercially available from Grace Specialty Polymers.) The catalyst was stirred into the sample by hand, and the sample was degassed for 30 min. before being injected into the 127 mm×127 mm×1.9 mm mold. The sample was cured by incubating it in the mold for 12 hours at room temperature. The material was removed from the mold and incubated further by ramping to 205° C. over the course of 12 hours and holding at 205° C. for an additional 18 hours. The material was tested for thermal conductivity, oil swell, and stability under cyclic strain at elevated temperature using the MER, as described in Example 1. The results appear in Table 1.

TABLE 1

Properties of the materials of the Examples and Comparative Examples

| Example | Thermal conductivity (W/m-K) | Initial S.M. (MPa) | Final S.M. (MPa) | Initial length (mm) | Final length (mm) | Change in S.M. (MPa) | Change in length (mm) | Weight loss (%) | Oil swell (%) |
|---|---|---|---|---|---|---|---|---|---|
| Ex. 1 | 0.28 | 2.062 | 1.793 | 11.388 | 10.575 | 0.27 | 0.81 | 1.1 | 6.5 |
| Ex. 2 | 0.40 | 3.082 | 2.832 | 11.759 | 11.169 | 0.25 | 0.59 | 0.95 | 6.2 |
| Ex. 3 | 0.54 | 5.821 | 5.509 | 12.824 | 12.319 | 0.31 | 0.50 | 0.75 | 4.3 |
| Ex. 4 | 0.80 | 7.464 | 9.332 | 12.511 | 12.218 | 1.87 | 0.29 | 0.23 | 2.0 |
| Ex. 5 | 0.87 | 2.378 | 3.555 | 9.92 | 7.621 | 1.18 | 2.30 | 0.51 | 6.3 |
| Ex. 6 | 0.92 | 1.567 | 2.46 | 7.643 | 5.908 | 0.89 | 1.74 | 0.95 | 13.7 |
| Ex. 7 | 0.83 | 1.178 | 1.889 | 7.324 | 5.898 | 0.71 | 1.43 | 0.79 | 22.3 |
| Ex. 8 | 0.78 | 1.821 | 2.397 | 6.303 | 5.422 | 0.58 | 0.88 | 0.67 | 14.7 |
| Ex. 9 | 0.66 | 7.212 | 11.809 | 12.529 | 11.513 | 4.60 | 1.02 | 1.86 | −1.4 |
| Ex. 10 | 0.71 | 2.044 | 5.968 | 9.638 | 8.064 | 3.92 | 1.57 | 2.05 | −2.4 |
| Ex. 11 | 0.69 | 3.77 | 7.096 | 9.934 | 9.14 | 3.33 | 0.79 | 1.14 | −0.5 |
| Comp. Ex. 1 | 0 69 | 4.823 | 3.474 | 11.945 | 4.805 | 1.35 | 7.14 | 5.99 | 2.9 |
| Comp. Ex. 2 | 0.71 | 4.108 | 7.004 | 11.412 | 5.495 | 2.90 | 5.92 | 6.54 | −0.9 |
| Comp. Ex. 3 | 0.85 | 4.804 | 6.271 | 11.091 | 7.393 | 1.47 | 3.70 | 4.36 | −1.5 |
| Comp. Ex. 4 | 0.67 | 4.971 | 6.622 | 11.464 | 5.43 | 1.65 | 6.03 | 3.94 | 45 |

The examples with the smallest values for change in S. M., change in length, weight loss and oil swell are preferred. Compared to the aluminum oxide-filled or commercially available Stycast™ 4952 materials of the Comparative Examples, the copper oxide-filled materials of the Examples showed significantly lower creep (change in length), weight loss, and/or change in storage modulus during the 60 hour MER test. In the Examples, copper oxide concentrations of 10 to 40 volume percent, preferably 20 to 40 volume percent, most preferably 30 to 40 volume percent provided greater stability. The oil swell also was lower in the materials of the Examples that contained diphenyl siloxane units at 16–24 mole percent compared to a pure PDMS material filled with copper oxide, aluminum oxide, or aluminum oxide and iron oxide. The thermal conductivity is comparable for Materials of the Examples and for aluminum oxide-filled materials containing identical polysiloxane types and filler contents.

The invention has been described in detail with particular reference to certain preferred embodiments thereof, but it should be appreciated that variations and modifications can be effected within the spirit and scope of the invention.

What is claimed is:
1. A fuser member having a layer comprising an addition crosslinked polyorganosiloxane elastomer, said layer having copper oxide particles dispersed therein in a concentration of from 5 to 40 volume percent of the total volume of said layer.
2. The fuser member of claim 1 wherein said copper oxide particle concentration is from 15 to 40 volume percent of the total volume of said layer.

3. The fuser member of claim 1 wherein said copper oxide particle concentration is from 30 to 40 volume percent of the total volume of said layer.

4. The fuser member of claim 1 wherein said elastomer is the product of addition crosslinking vinyl substituted multifunctional siloxane polymer and multifunctional organo-hydrosiloxane or multifunctional siloxy-silane.

5. The fuser member of claim 4 wherein said vinyl substituted multifunctional siloxane polymer consists essentially of repeating units having the general structures:

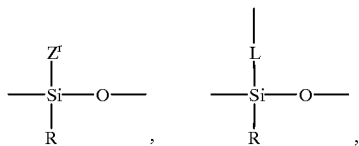

and

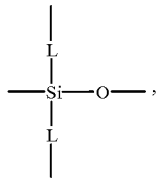

and terminal units having the general structure:

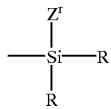

wherein

R is alkyl having from 1 to 8 carbons, or aryl having a solitary ring of from 6 to 14 carbons including carbons of any ring substituents;

$Z^r$ is alkyl having from 1 to 8 carbons, olefin having from 2 to 8 carbons and a terminal vinyl moiety, or aryl having a solitary ring of from 6 to 14 carbons including carbons of any ring substituents; and L is —O—, or —$(CH_2)_e$—, where e is an integer from 1 to about 8;

with the proviso that at least two $Z^r$ moieties are olefinic groups having from 2 to 8 carbons and a terminal vinyl moiety; and the proviso that about 25 percent or less of said R groups are aryl.

6. The fuser member of claim 4 wherein said vinyl substituted multifunctional siloxane polymer has the general structure:

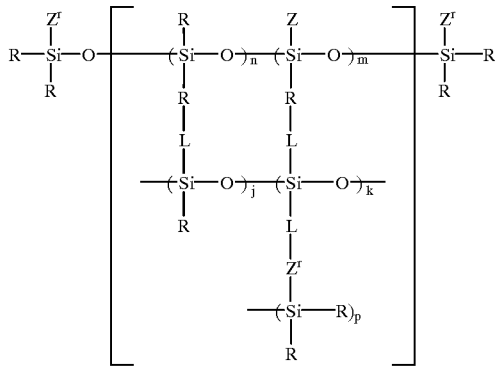

wherein

R is alkyl having from 1 to 8 carbons, or aryl having a solitary ring of from 6 to 14 carbons including carbons of any ring substituents;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring of from 6 to 14 carbons including carbons of any ring substituents;

L is —O—, or —$(CH_2)_e$—, where e is an integer from 1 to about 8;

n, m, j, k and p are integers such that the weight average molecular weight of said siloxane polymer between vinyl groups is from 7,000 to 100,000;

j+k is less than 5 percent of the total of n+m+j+k; and $0 \leq p \leq (j+2k)$;

with the proviso that if m is 0 or 1, $Z^r$ is an olefinic group having from 2 to 8 carbons; and the proviso that about 25 percent or less of said R groups are aryl.

7. The fuser member of claim 6 wherein j+k is less than about 2 percent of the total of n+m+j+k.

8. The fuser member of claim 6 wherein from about 3 to 17 percent of said R groups are phenyl and the remainder of said R groups are alkyl having from 1 to 4 carbons.

9. The fuser member of claim 6 wherein said multifunctional organo-hydrosiloxane has the general structure:

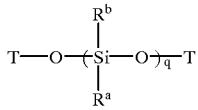

wherein

Each T represents:

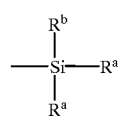

or both T's together represent atoms completing an organo-hydrosiloxane ring;

$R^b$ is H or $R^a$; and $R^a$ is alkyl having from 1 to 8 carbons, or aryl having a solitary ring of from 6 to 14 carbons including carbons of any ring substituents;

with the proviso that at least two $R^b$ moieties are H.

10. The fuser member of claim 4 wherein said multifunctional organo-hydrosiloxane has the general structure:

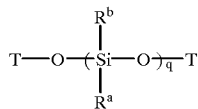

wherein

Each T represents:

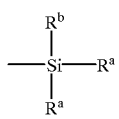

or both T's together represent atoms completing an organo-hydrosiloxane ring;

$R^b$ is H or $R^a$; and $R^a$ is alkyl having from 1 to 8 carbons, or aryl having a solitary ring of from 6 to 14 carbons including carbons of any ring substituents;

with the proviso that at least two $R^b$ moieties are H.

11. The fuser member of claim 4 wherein said multifunctional organo-hydrosiloxane is selected from the group consisting of 1,3,5,7-tetramethylcyclotetra-siloxane; and compounds having the structural formula:

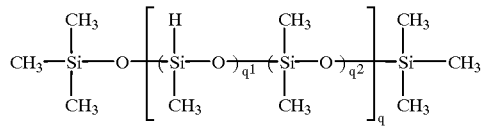

wherein $q^1+q^2=q$, and q is a number such that the molecular weight is from about 900 to 3,500.

12. The fuser member of claim 4 wherein said multifunctional siloxy- siloxane has the general structure:

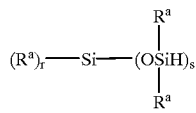

wherein $R_a$ is alkyl having from 1 to 8 carbons, or aryl having a solitary ring of from 6 to 14 carbons including carbons of any ring substituents;

r is 0 or 1;

s is 3 or 4; and r+s=4.

13. The fuser member of claim 4 wherein said olefin substituted multifunctional siloxane polymer has the general structure:

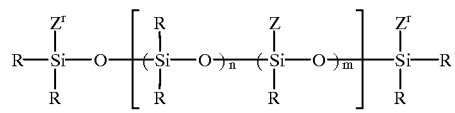

wherein

R is alkyl having from 1 to 8 carbons, or aryl having a solitary ring of from 6 to 14 carbons including carbons of any ring substituents;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring of from 6 to 14 carbons including carbons of any ring substituents; and n and m are integers such that the weight average molecular weight of said siloxane polymer between vinyl groups is from 7,000 to 100,000;

with the proviso that at least two of the Z and $Z^r$ groups are olefin having from 2 to 8 carbons and a terminal vinyl moiety; and the proviso that about 25 percent or less of said R groups are aryl.

14. The fuser member of claim 13 wherein each $Z^r$ is an olefinic group having from 2 to 8 carbons and a terminal vinyl moiety.

15. The fuser member of claim 14 wherein m is 0 and $Z^r$ is vinyl.

16. The fuser member of claim 14 wherein R is methyl.

17. The fuser member of claim 13 wherein each $Z^r$ is alkyl having from 1 to 8 carbons, or aryl having a solitary ring of from 6 to 14 carbons including carbons of any ring substituents.

18. The fuser member of claim 17 wherein R is methyl.

19. The fuser member of claim 4 wherein said copper oxide particle concentration is from 30 to 40 volume percent of the total volume of said layer.

20. The fuser member of claim 19 wherein said vinyl substituted multifunctional siloxane polymer comprises 10 to 17 mole percent diphenyl silyl and 90 to 83 mole percent dimethyl silyl.

21. The fuser member of claim 4 wherein said vinyl substituted multifunctional siloxane polymer has at least two moieties having the general structure:

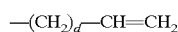

where d is an integer from 0 to about 6.

22. The fuser member of claim 21 wherein d is from 0 to 3.

23. The fuser member of claim 4 wherein said vinyl substituted multifunctional siloxane polymer is selected from the group consisting of polymers having the structural formula:

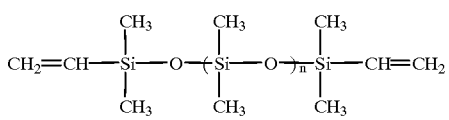

or the structural formula:

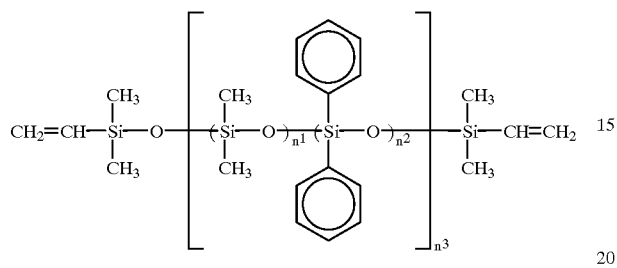

or the structural formula:

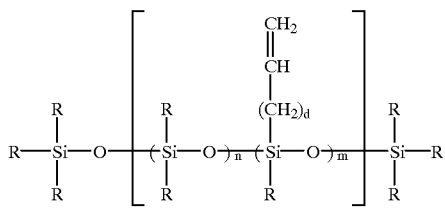

wherein, in the above formulas, d is an integer from 0 to 6;

$n^1 + n^2 = n^3$;

$n^1/n^2$ is greater than or equal to 3; and n, $n^3$ and m are integers such that the weight average molecular weight of said siloxane polymer between vinyl groups is from 7,000 to 100,000.

24. A fuser member comprising a core and a layer overlying said core, said layer comprising: an addition crosslinked polyorganosiloxane elastomer, said elastomer being the addition product of:

(A) vinyl substituted multifunctional siloxane polymer having the general structure:

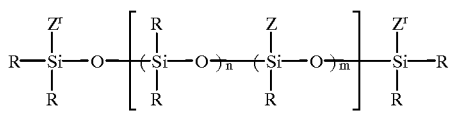

wherein

R is alkyl having from 1 to 8 carbons, or aryl having a solitary ring of from 6 to 14 carbons including carbons of any ring substituents, with the proviso that about 25 percent or less of said R groups are aryl;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring of from 6 to 14 carbons including carbons of any ring substituents;

n and m are integers such that the weight average molecular weight of said siloxane polymer between vinyl groups is from 7,000 to 100,000, with the proviso that if m is 0 or 1, at least two of the Z and $Z^r$ groups are olefinic groups having from 2 to 8 carbons and a terminal vinyl moiety; and (B) multifunctional organo-hydrosiloxane having the general structure:

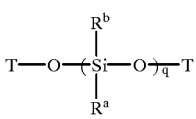

wherein

Each T represents:

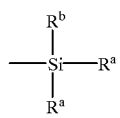

or both T's together represent atoms completing an organo-hydrosiloxane ring;

$R^b$ is H or $R^a$; and $R^a$ is alkyl having from 1 to 8 carbons, or aryl having a solitary ring of from 6 to 14 carbons including carbons of any ring substituents;

with the proviso that at least two $R^b$ moieties are H; said layer further comprising copper oxide particles dispersed therein in a concentration of from 5 to 40 volume percent of the total volume of said layer.

25. The fuser member of claim 24 wherein said vinyl substituted multifunctional siloxane polymer comprises 10 to 17 mole percent diphenyl silyl and 90 to 83 mole percent dimethyl silyl; and said concentration of said copper oxide particles is from 20 to 40 volume percent of the total volume of said layer.

26. The fuser member of claim 24 wherein said vinyl substituted multifunctional siloxane polymer has the general structure:

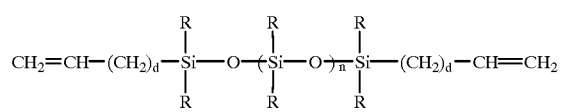

or the general structure:
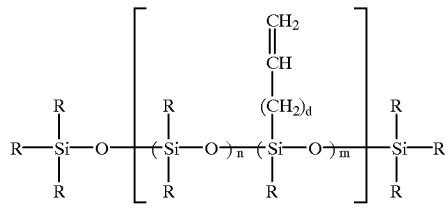
or the general structure:
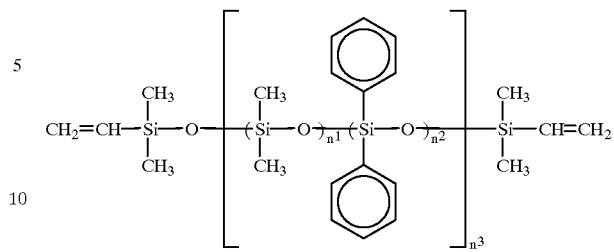
wherein
$n^1+n^2=n^3$ and $n^1/n^2$ is greater than or equal to 3; and d is an integer from 0 to 6.
* * * * *